US006662760B1

(12) United States Patent
Stanglmaier et al.

(10) Patent No.: US 6,662,760 B1
(45) Date of Patent: Dec. 16, 2003

(54) METHOD AND APPARATUS FOR CONTROLLING COMBUSTION TIMING IN AN HOMOGENOUS-CHARGE COMPRESSION-IGNITION ENGINE

(75) Inventors: Rudolf H. Stanglmaier, San Antonio, TX (US); Charles E. Roberts, Jr., San Antonio, TX (US); Daniel W. Stewart, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/272,262

(22) Filed: Oct. 17, 2002

(51) Int. Cl.[7] .............................................. F02D 41/14
(52) U.S. Cl. ....................... 123/3; 123/198 A; 123/304; 123/676; 123/687
(58) Field of Search ........................ 123/1 A, 3, 198 A, 123/27 R, 304, 478, 672, 676, 687

(56) References Cited

U.S. PATENT DOCUMENTS

| 5,832,880 | A |   | 11/1998 | Dickey |          |
|-----------|---|---|---------|--------|----------|
| 5,967,100 | A |   | 10/1999 | Firey  |          |
| 6,032,617 | A |   | 3/2000  | Willi et al. |    |
| 6,092,512 | A | * | 7/2000  | Ma     | 123/568.15 |
| 6,095,102 | A |   | 8/2000  | Willi et al. |    |
| 6,155,101 | A |   | 12/2000 | Renault et al. |  |
| 6,295,973 | B1| * | 10/2001 | Yang   | 123/543  |
| 6,345,610 | B1| * | 2/2002  | Yang   | 123/551  |
| 6,378,489 | B1| * | 4/2002  | Stanglmaier et al. | 123/304 |

OTHER PUBLICATIONS

Christensen, et al, (1999) "Demonstrating the Multi Fuel Capability of a Homogeneous Charge Compression Ignition . . . " SAE Paper 1999–01–3679, pub Oct. 25, 1999.
Olsson, et al (2001) "Closed Loop Control of a HCCI–Engine", SAE Paper 2001–01–1031; pub. Mar. 5, 2001.
Olsson, et al (2001) "A Turbocharged Dual–Fuel HCC Engine", SAE Paper 2001–01–1896, pub. May 1, 2001.
Stanglmaier, et al (2001) "HCCI Combustion Control in a Multi–Cylinder Engine Through Dual Fuel Operation" SAE Paper 2001–01–0151, pub. May 1, 2001.

* cited by examiner

Primary Examiner—Tony M. Argenbright
(74) Attorney, Agent, or Firm—Gunn & Lee, P.C.

(57) ABSTRACT

Timing of the combustion event in an homogenous-charge compression-ignition engine is controlled by adjusting the reactivity of the fuel, or of the fuel/air mixture inducted into the combustion chamber of the engine, thereby providing a means of controlling the combustion phasing. When the mixture is made more reactive, combustion occurs earlier in the cycle, and when the mixture reactivity is decreased, the reaction phasing is retarded. In the present invention, the reactivity of the intake charge is regulated in one embodiment by using a catalytic reaction in the intake system to partially, oxidize the intake mixture. In another embodiment, fuel reactivity is adjusted by passing a portion of the fuel through a catalyst or a non-thermal plasma generator prior to injection into the engine. In still another illustrated embodiment, an additive is controllably added to the fuel prior to injection into the engine to increase or decrease fuel reactivity.

33 Claims, 4 Drawing Sheets

METHOD AND APPARATUS FOR CONTROLLING COMBUSTION TIMING IN AN HOMOGENOUS-CHARGE COMPRESSION-IGNITION ENGINE

BACKGROUND OF THE INVENTION

1. Technical Field

This invention relates generally to a method and apparatus for controlling homogeneous-charge compression-ignition (HCCI) engines, and more particularly to a method and apparatus for controlling the combustion timing in HCCI engines by altering the reactivity of fuel, or of a mixture of air and fuel, used in HCCI combustion.

2. Background Art

Homogeneous-charge compression ignition (HCCI) is a mode of combustion in which a premixed air/fuel charge is elevated in temperature during the compression stroke until the thermodynamic conditions of the premixed charge are satisfactory for the initiation of combustion. HCCI combustion occurs when a lean homogeneous mixture of fuel and air begins combustion toward the end of the engine compression stroke. A homogeneous mixture of fuel and air can be created using conventional automotive-style port fuel injectors or by early, i.e., near bottom dead center (BDC), direct in-cylinder fuel injection. The thermodynamic conditions and temperature-time history of the mixture must be correct for pre-flame reactions to occur. HCCI combustion is characterized by multiple combustion sites in a lean fuel charge so that the peak flame temperature is similar to the bulk gas temperature. Low peak flame temperature, relative to conventional diesel diffusion flame combustion, results in NO, emissions that are 90% to 98% lower than typical conventional diesel combustion emissions.

HCCI combustion is difficult to control, primarily due to an inability to accurately and repeatably control the start of combustion (SOC) for each compression stroke. If conditions are not favorable for combustion, misfire will occur. For example, if the start of combustion occurs too early, the mixture will burn during the compression stroke, resulting in possible engine damage and poor cycle efficiency. Also, early SOC contributes to high gas temperatures in the next engine cycle, which will again lead to early SOC. Typically, exhaust gas recirculation. (EGR) is used in an HCCI engine to raise the intake gas temperature to a level where HCCI combustion will occur.

However, combustion phasing through intake gas temperature control has several inherent disadvantages. First, air intake temperature provides weak control, i.e., a large change in temperature results in only a modest change in combustion phasing. Secondly, high intake air temperatures result in decreased volumetric efficiency and reduced power output. Thirdly, even with complete control of intake air temperature, there is only limited control of the reaction phasing. Also, if recirculated exhaust gas is used for temperature control, the exhaust gas is a diluent that can also effect combustion rate. Moreover, controlling intake air temperature is difficult in practical engines. In homogeneous-charge compression engines, the inability to effectively control combustion timing results in decreased power output and efficiency.

U.S. Pat. No. 5,832,880 granted Nov. 10, 1998 to Daniel W. Dickey for an APPARATUS AND METHOD FOR CONTROLLING HOMOGENEOUS CHARGE COMPRESSION IGNITION COMBUSTION IS DIESEL ENGINES, and assigned to the assignee of the present invention, describes an apparatus and method for controlling homogenous-charge compression-ignition combustion by water injection and thereby regulating the start of combustion during the compression stroke, or early in the expansion stroke, of each combustion cycle. Although the apparatus and method described in the Dickey patent can control the start of combustion in HCCI engines, they require an on-board supply of water, a water pump, a water flow distribution system, and additional, or dual-fluid, injectors to provide both water and fuel to the combustion chamber of the engine. These requirements add to the cost and control complexity of an HCCI diesel engine.

The present invention is directed to overcoming the problems set forth above with respect to current methods of controlling HCCI combustion. It is desirable to have a method and apparatus for controlling HCCI combustion that does not rely on intake temperature control or water injection. It is also desirable to have such a method and apparatus that effectively controls HCCI combustion without sacrificing power output and engine efficiency, or adding significant cost to the engine.

SUMMARY OF THE INVENTION

In accordance with one aspect of the present invention, a method for controlling combustion timing in an homogenous-charge compression-ignition engine includes providing an intake manifold that extends between a source of air and an intake port of the engine and has a flow-through portion and a by-pass portion. The by-pass portion has a catalyst incorporated therein that is adapted to oxidize a mixture of air and fuel passing through the by-pass portion. The method further includes providing a source of fuel that is in fluid communication with the intake manifold at a position between the source of air and the by-pass portion of the intake manifold. A continuous flow of air is introduced into the intake manifold. Fuel is injected into the continuous flow of air and forms a mixture of air and fuel in the intake manifold. A means is provided for controlling the relative amounts of the mixture of air and fuel passing through the flow-through and by-pass portions of the intake manifold. At least one engine operating parameter is sensed and the relative amounts of the mixture of air and fuel passing through the flow-through and by-pass portions of the intake manifold are controlled in response to the sensed value of the engine operating parameter.

In accordance with another aspect of the present invention, a method for controlling the combustion timing in an homogenous-charge compression-ignition engine includes providing a fuel conduit that extends from a source of fuel to at least one fuel introduction port that is in fluid communication with a combustion chamber of the engine. The fuel conduit has a flow-through portion and a by-pass portion. The by-pass portion has a means incorporated therein that is adapted to decompose fuel passing therethrough. The method further includes providing a means for controlling the relative amounts of fuel passing through the flow-through and by-pass portions of the fuel conduit. At least one engine operating parameter is sensed and the relative amounts of fuel passing through the flow-through and bypass portions of the fuel conduit is controlled in response to a sensed value of the engine operating parameter.

In accordance with yet another aspect of the method for controlling the combustion timing in an homogenous-charge compression-ignition engine includes providing a fuel conduit that extends between a source of fuel and at least one fuel introduction port that is in fluid communication with a combustion chamber of the engine. The method further includes providing at least one source of a fuel additive adapted to alter the reactivity of the fuel. The source of fuel additive is in controllable fluid communication with the fuel conduit. The amount of fuel additive introduced into the fuel conduit is controlled in response to a sensed value of at least one engine operating parameter.

In accordance with still another aspect of the present invention, an apparatus for controlling the combustion timing of an homogenous-charge compress-ignition engine has an intake port through which a mixture of air and fuel is introduced into the combustion chamber of the engine. The apparatus includes an intake manifold extending between a source of air and the intake port of the engine. The intake manifold has a flow-through portion and a by-pass portion. A source of fuel is disposed in controlled fluid communication with the intake manifold at a position between the source of air and the by-pass portion whereat fuel injected into the intake manifold forms a mixture of air and fuel. A catalyst is disposed in the by-pass portion of the intake manifold and is adapted to oxidize a mixture of fuel and air passing through the by-pass portion. The apparatus further includes a means for controlling the relative amounts of the mixture of air and fuel passing through the flow-through and by-pass portions of the intake manifold, and a means for sensing at least one engine operating parameter and providing a signal correlative of the sensed engine operating parameter. The apparatus also includes an electronic control unit in electrical communication with the means for controlling the relative amounts of the mixture of air and fuel passing through the flow-through and by-pass portions of the intake manifold and with the means for sensing at least one engine operating parameter and providing a signal correlative of the sensed engine operating parameter. The electronic control unit is adapted to provide a control signal to the means for controlling the relative amounts of the mixture fuel and air passing through the flow-through and by-pass portions of the intake manifold in response to the signal correlative of the sensed engine operating parameter.

In still another aspect of the present invention, an apparatus for controlling the combustion timing of an homogenous-charge compression-ignition engine having at least one fuel injector in direct fluid communication with a combustion chamber of the engine includes a fuel conduit that extends between a source of fuel and the fuel injector. The fuel conduit has a flow-through portion and a by-pass portion. The by-pass portion has a means incorporated therein that is adapted to decompose fuel passing therethrough. The apparatus further includes a means for controlling the relative amounts of fuel passing through the flow-through and by-pass portions of the fuel conduit and a means for sensing at least one engine operating parameter and providing a signal correlative of the sensed engine operating parameter. The apparatus also includes an electronic control unit in electrical communication with the means for controlling the relative amounts of fuel passing through the flow-through and by-pass portions of the fuel conduit and with the means for sensing at least one engine operating parameter. The electronic control unit provides a control signal to the means for controlling the relative amounts of fuel passing through the flow-through and by-pass portions of the fuel conduit in response to the signal correlative of a sensed engine operating parameter.

In accordance with an additional aspect of the present invention, an apparatus for controlling the combustion timing of an homogenous-charge compression-ignition engine having a first conduit extending between a source of fuel and at least one fuel introduction port includes a source of at least one fuel additive that has a composition sufficient to alter the reactivity of the fuel when admixed therewith. The apparatus further includes a second conduit in controlled fluid communication with a source of the fuel additive and the fuel conduit. A means is provided for controlling the amount of fuel additive passing through the second conduit. An additional means is provided for sensing at least one engine operating parameter and providing a signal correlative of the sensed engine operating parameter. The apparatus further includes an electronic control unit in electrical communication with the means for controlling the amount of fuel additive passing through the second conduit and with the means for sensing at least one engine operating parameter and providing a signal correlative of the sensed operating parameter. The electronic control unit is adapted to provide a control signal to the means for controlling the amount of fuel passing through the second fuel conduit in response to the signal correlative of the sensed engine operating parameter.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF THE INVENTION

The present invention regulates the timing of the combustion event of homogenous-charge compression-ignition engines by adjusting the reactivity of fuel or of the fuel/air mixture inducted into a combustion chamber of the engine, thereby advantageously providing a means for controlling the combustion phasing. When the mixture is made more reactive, combustion occurs earlier in the cycle, and when the mixture reactivity is decreased, the reaction phasing is retarded. In carrying out the present invention, the reactivity of the intake charge may be regulated in one of several several ways, each of which is described in the following illustrative examples.

Figure 1:
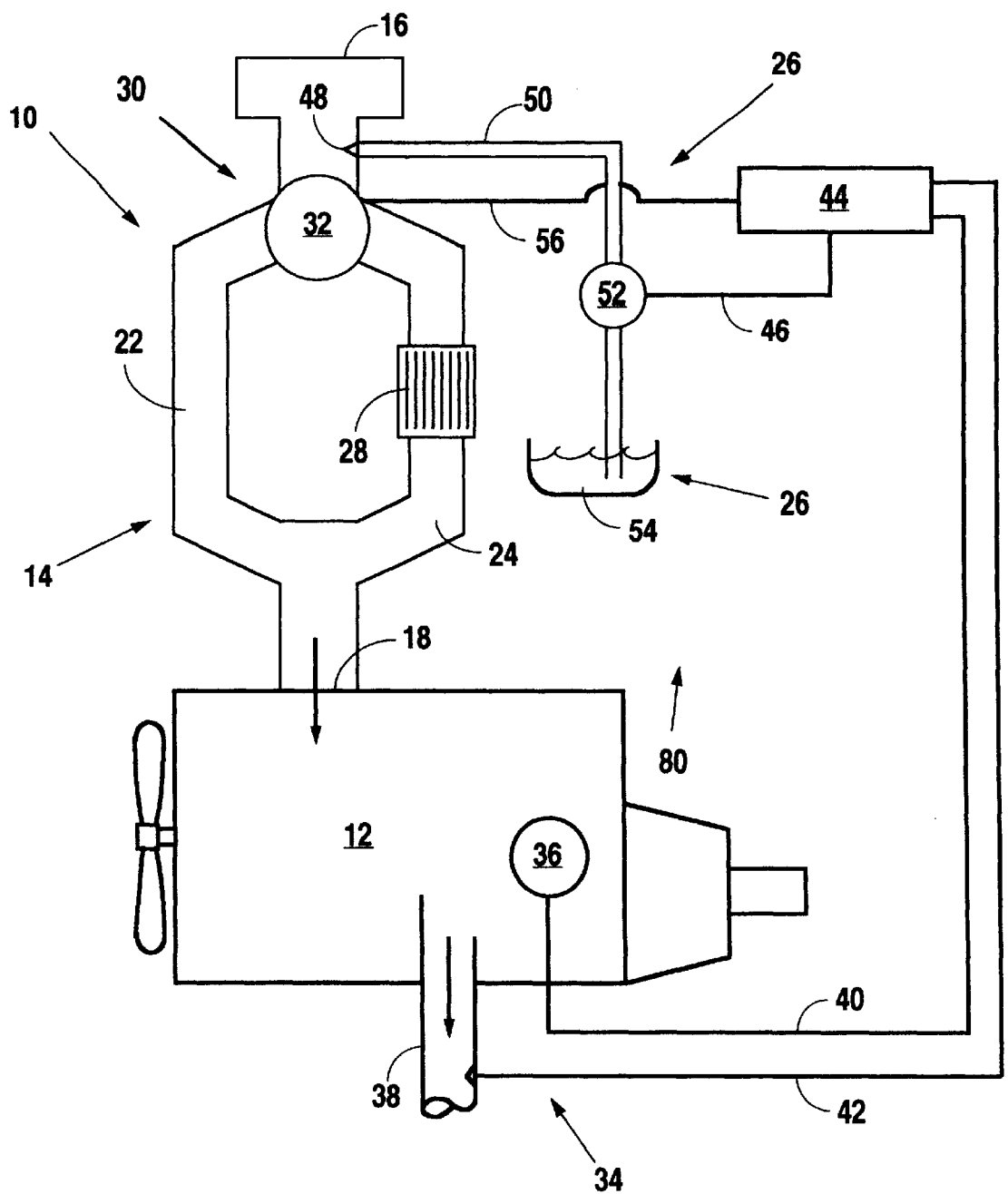
FIG. 1 is a schematic illustration of one embodiment of the present invention in which HCCI combustion timing is controlled by altering the reactivity of the air/fuel mixture introduced into a combustion chamber of the engine.

A first illustrative example of an apparatus for controlling the combustion timing in an homogenous-charge compression-ignition engine is schematically represented in FIG. 1. In this embodiment, an apparatus 10 suitable for controlling the combustion timing of an homogenous-charge compression-ignition engine 12 in accordance with the present invention has an intake manifold, generally indicated by reference numeral 14, that extends between a source of air 16 and an intake port 18 through which a mixture of air and fuel is introduced into a combustion chamber, not shown, of the engine 12. The intake manifold 14 has a flow-through portion 22 and a by-pass portion 24. A source of fuel 26 is introduced into the intake manifold 14 by a conventional fuel injector 48, or by throttle-body injection not shown, at a position between the source of air 16 and the by-pass portion 24, and forms a mixture of air and fuel in the intake manifold at that position.

Importantly, a catalyst 28 is disposed in the by-pass portion 24 of the intake manifold 14 and has a composition suitable for oxidizing an air/fuel mixture flowing through the by-pass portion 24. Suitable catalysts include, but are not limited to, zeolite, copper, platinum, palladium, and rhodium.

The apparatus 10 further includes a means 30 for controlling the relative amounts of the mixture of air and fuel passing through the flow-through portion 22 and the by-pass portion 24 of the intake manifold 14, such as a modulatable three-way directional flow control valve 32.

The apparatus 10 further includes a means 34 for sensing at least one engine operating parameter and providing a signal correlative of the sensed engine operating parameter. In the illustrated embodiment, the means 34 includes sensors commonly used to control engine operation, such as a crankshaft position sensor 36 or an exhaust gas temperature sensor 38. The crankshaft position sensor 36 and the exhaust gas temperature 38 provide respective signals 40,42 that are correlative of the respectively sensed engine operating parameters, i.e., engine speed and exhaust gas temperature. The apparatus 10 further includes a conventional programmable electronic control unit 44 that is in electrical communication with the three-way directional flow control valve 32 and with the crankshaft position sensor 36 by way of the signal 40 and the exhaust gas temperature sensor 38 by way of the signal 42. The electronic control unit 44 is programmed to provide a control signal 46 for modulation of the three-way directional flow control valve 32 and thereby controls the relative amounts of the mixture of fuel and air passing through the flow-through and by-pass portions 22, 24 of the intake manifold 14, in response to the sensed values of one or both of the signals 40, 42, or other sensor signals not specifically described, that are correlative of sensed engine operating parameters.

In the illustrative embodiment, the source of fuel 26 includes the fuel injector 48 disposed in the intake manifold 14 at a position upstream of the modulatable three-way directional flow control valve 32. A fuel line 50 extends between a fuel pump 52 and the fuel injector 48. The fuel pump 52 is in fluid communication with a fuel tank 54. Operation of the fuel pump 52 is controlled by a control signal 56 provided by the electronic control unit 44. Injection timing and the amount of fuel injected into the intake manifold 14 is controlled by an electrical signal 56 provided by the electronic control unit 44.

A first exemplary embodiment of a method for controlling combustion timing in an homogenous-charge compression-ignition engine is described as follows, with continued reference to the apparatus 10 described above and illustrated in FIG. 1. The method includes providing the intake manifold 14 that extends between the source of air 16 and the intake port 18 of the engine 10, and has a flow-through portion 22 and a by-pass portion 24. The source of fuel 26 is disposed such that it is in fluid communication with the intake manifold 14 at a position between the source of air 16 and the modulatable three-way directional flow control valve 32 which provides a means 30 for controlling the relative amounts of the air/fuel mixture passing through the flow-through and by-pass portions 22, 24 of the intake manifold 14. The method includes introducing a continuous flow of air into the intake manifold 14 and injecting fuel into the continuous flow of air and forming a mixture of air and fuel in the intake manifold 14. The relative amounts of the mixture of air and fuel passing through the flow-through and by-pass portions 22, 24 of the intake manifold 14 are controlled in response to a sensed value of at least one engine operating parameter, as described above.

In the following description of alternative embodiments of the present invention, elements of the particular embodiments that are common with the above-described first exemplary embodiment are identified by the same reference number. Elements of the particular described embodiments that are different or not found in the first-described embodiment are identified with reference numerals distinct from those used to describe the first embodiment.

Figure 2:
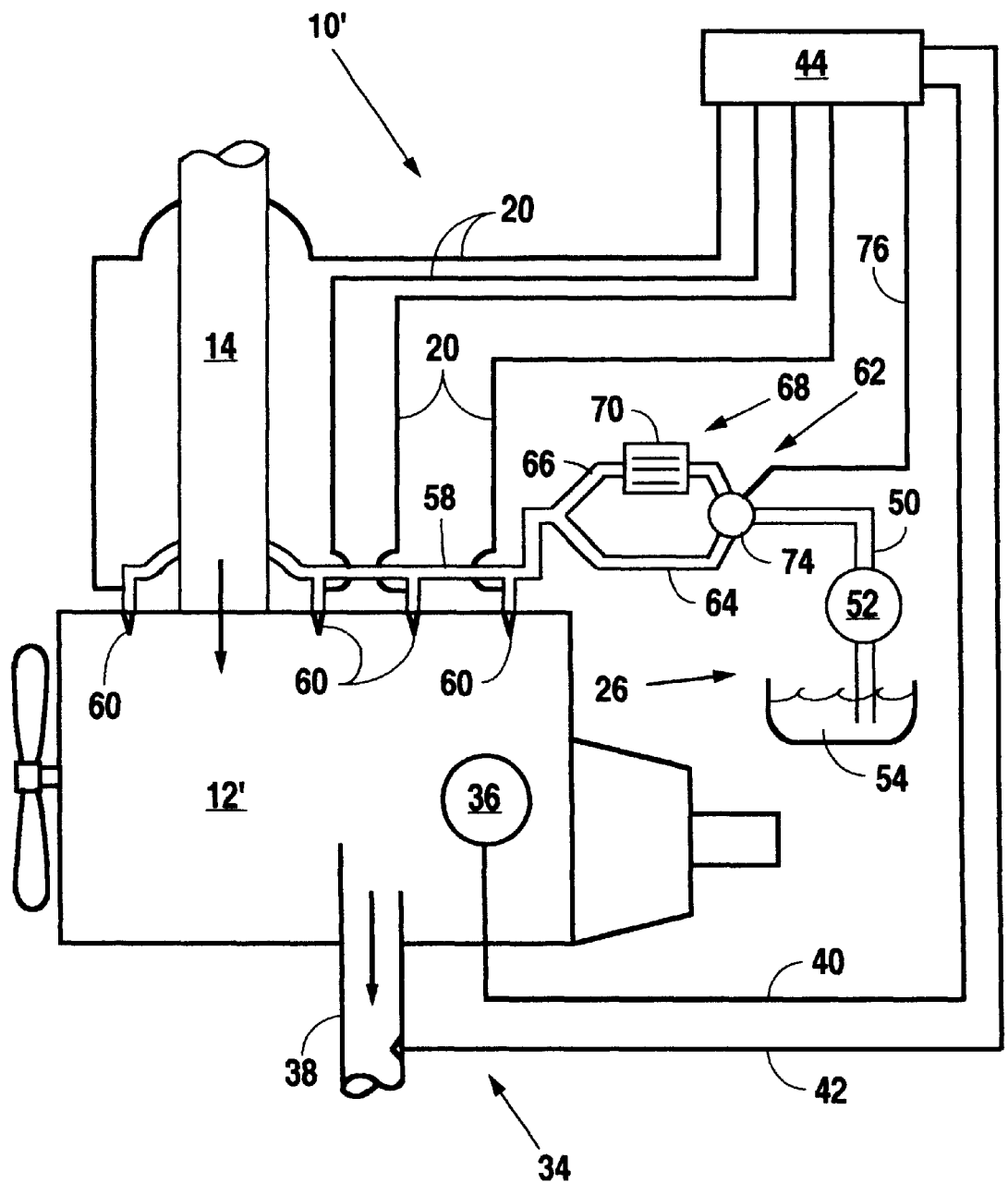
FIG. 2 is a schematic illustration of an alternate embodiment of the present invention in which HCCI combustion timing is controlled by passing controlled amounts of fuel through a catalyst prior to injection into a combustion chamber of the engine.

A second illustrative example of an apparatus for controlling the combustion timing of an homogenous-charge compression-ignition engine is schematically represented in FIG. 2. In this embodiment, combustion timing is controlled by altering the reactivity of the parent fuel prior to injection, either directly into the combustion chamber or by port injection. In the illustrative example presented in FIG. 2, an apparatus 10' for controlling the combustion timing of an homogenous-charge compression-ignition engine 12' has a fuel conduit generally indicated by reference numeral 62 that extends between the source of fuel 26 and the fuel injectors 60 by way of a fuel rail 58. The fuel conduit 62 has a flow-through portion 64 and a by-pass portion 66. A means 74, such as a modulatable three-way fluid flow control valve, is provided for controlling relative amounts of fuel passing through the flow-through portion 64 and the by-pass portion 66 of the fuel conduit 62. The operation of the modulatable three-way fluid flow control valve 74 is controlled by a signal 76 provided by the electronic control unit 44. In this embodiment, the electronic control unit 44 is programmed to receive at least one of the signals 40, 42 respectively provided by the crankshaft position sensor 36 and the exhaust gas temperature sensor 38, or other sensors, not shown, and deliver the control signal 76 to the modulatable three-way fluid flow control valve 74 whereby the relative amounts of fuel passing through the flow-through and by-pass portions 64, 66 of the fuel conduit 62 are controlled.

Importantly, the by-pass portion 66 has a means 68 incorporated therein that is adapted to alter the reactivity of the parent fuel passing through the by-pass portion 66 of the fuel conduit 62. In a first example of this embodiment, shown in FIG. 2, the means 68 adapted to alter the reactivity of fuel passing through the by-pass portion 66 comprises a reduction catalyst 70 preferably selected from the group consisting of zeolite, copper, platinum, palladium, rhodium, and combinations thereof. The catalyst 70 promotes partial decomposition of the parent fuel in the absence of an oxidizer (no air) at relatively low temperatures, thereby altering the reactivity of the parent fuel prior to injection.

Figure 3:
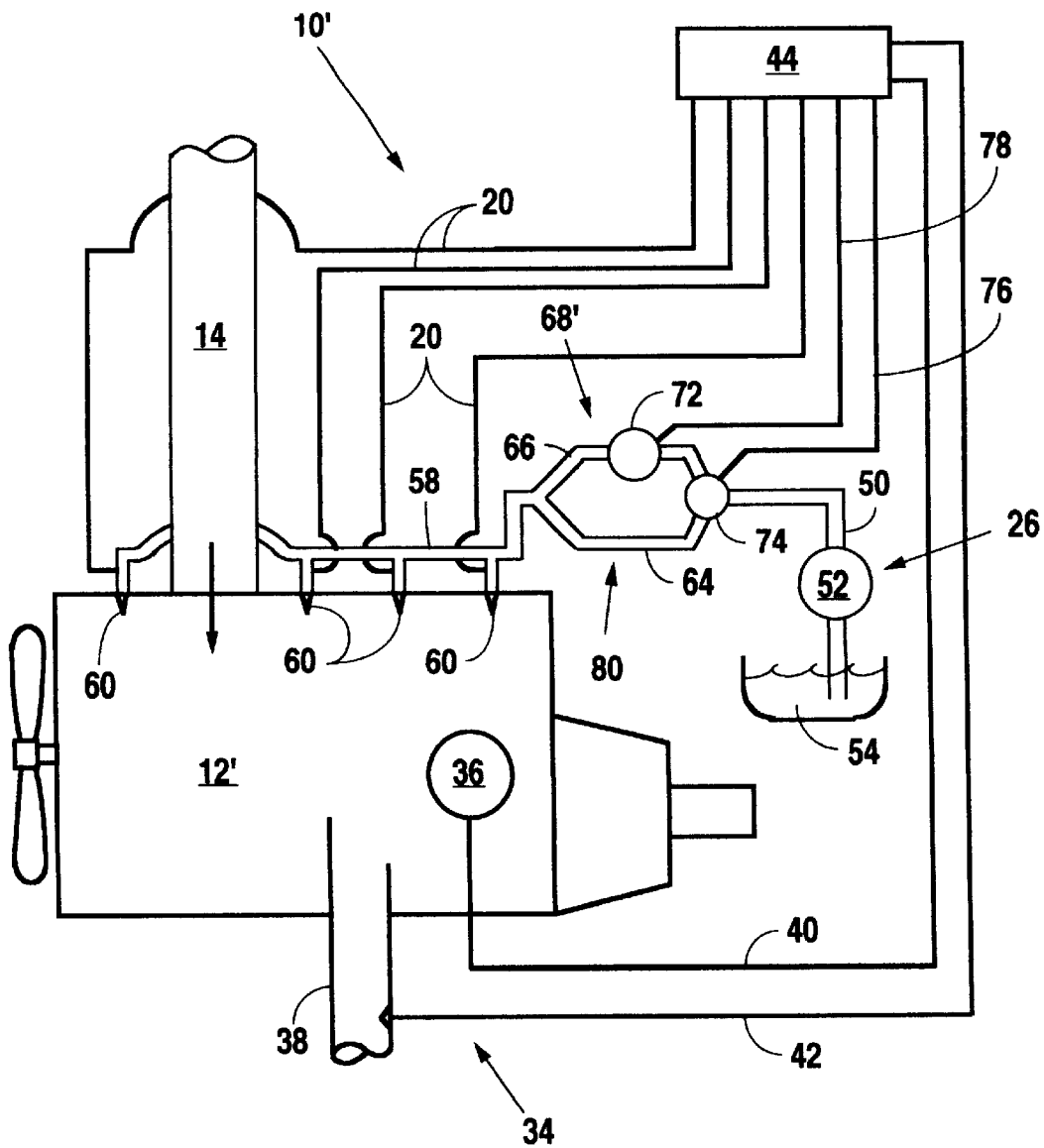
FIG. 3 is a schematic illustration of yet another embodiment of the present invention in which HCCI combustion timing is controlled by passing controlled amounts of fuel through a non-thermal plasma generator prior to injection into a combustion chamber of the engine.

In a second illustrative example, illustrated in FIG. 3, a means 68' is incorporated in the by-pass portion 66 of the fuel conduit 62 and comprises a non-thermal plasma generator 72, for example, a corona discharge device, such as the Litex CDD®, produced by Litex, Inc., Sherman Oaks, Calif., previously used to reduce hazardous emissions generated by gasoline-powered automobile engines. The non-thermal plasma generator 72 provides a high-energy, low-temperature electric discharge whereby energetic electrons and free radicals are produced from the parent gas. These particles then collide with stable species and promote decomposition in the absence of an oxidizer. Alternatively, other non-thermal plasma generators such as streamer-type micro discharge devices and dielectric discharge devices may similarly be incorporated in the by-pass portion 66 of the fuel conduit 62 to alter the reactivity of the parent fuel. Operation of the non-thermal plasma generator 72 is controlled by a signal 76 provided by the electronic control unit 44.

In the examples illustrated in FIGS. 2 and 3, a portion of the parent fuel is treated with a catalyst or non-thermal plasma to decompose the parent fuel into less stable molecules that are more reactive. In these embodiments, the fuel injectors 60 may have a tip portion disposed within respective combustion chambers, as shown, or positioned at an intake port of the respective combustion chambers. In the conventional manner, operation, i.e., the opening, duration and closing, of the fuel injectors 60 is controlled by a signal 20 provided by the electronic control unit 44.

Thus, the apparatus 10' illustrated in FIGS. 2 and 3 can advantageously be used to control the combustion timing of the homogenous-charge compression-ignition engine 12' by providing the means 68 to alter the reactivity of the parent fuel 26 passing through the by-pass portion 66 of the fuel conduit 62. The relative amounts of fuel passing through the flow-through portion 64 and by-pass portion 66 of the fuel conduit 64 are control led through operation of the modulatable three-way fluid flow control valve 74 which is modulated in accordance with the control signal 76 received from the electronic control unit 44 in accordance with at least one signal 40,42 that is correlative of an engine operating parameter.

A third embodiment of an apparatus 10" for controlling the combustion timing of an homogenous-charge compression-ignition engine 12" uses one or more fuel additives to alter the reactivity of a single fuel type. More specifically, in this embodiment the apparatus 10" has a first conduit, generally indicated by reference numeral 80, that is in controllable fluid communication with the source of fuel 26 and the fuel injectors 60. The apparatus 10" further includes a source of at least one fuel additive 82/84 that has a composition sufficient to alter the reactivity of the parent fuel 26 when admixed with the parent fuel. It is well known that various additives can be used in very small proportions to alter the reactivity of a fuel. It is generally easier to increase the reactivity of a fuel using reactivity enhancers, such as ethyl-hexyl-nitrate or alkyl-nitrate treatment compositions generally used as cetane improvers and ignition accelerators of diesel fuel. It is also possible to reduce reactivity of fuel by adding small proportions of a fuel reactivity reducing agent, such as tetra-ethyl-lead.

The apparatus 10" further includes a modulatable four-way fluid flow control valve 88 to control the amount of fuel additive 82/84 passing through the second conduit 86 to the first conduit 80. Operation of the modulatable four-way fluid flow control valve 88 is controlled by a signal 90 provided by the electronic control unit 44.

Figure 4:
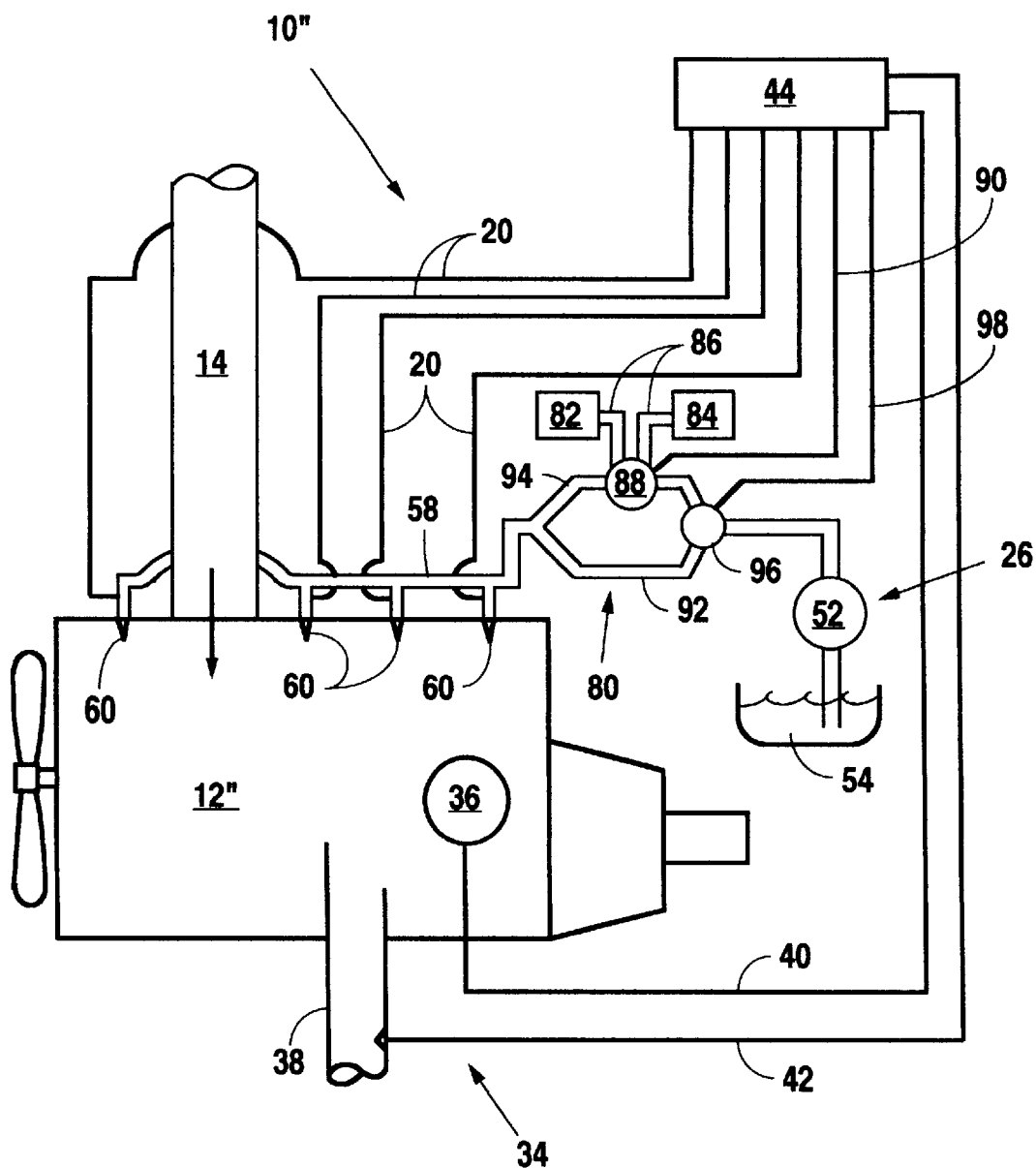
FIG. 4 is a schematic illustration of yet another embodiment of the present invention in which HCCI combustion timing is controlled by admixing an additive adapted to alter fuel reactivity prior to the introduction of the altered fuel into the engine.

In carrying out this embodiment, the fuel additive 82/84 may be controllably introduced into a primary fuel line. However, as shown in FIG. 4, it is desirable, for better additive control and distribution, for the first conduit 80 to have a flow-through portion 92 and a by-pass portion 94, with the by-pass portion 94 in fluid communication with the four-way fluid flow control valve 88. By this arrangement, the selected additive is mixed with the fuel 26 discharged from the by-pass portion 94, whereupon the treated and untreated fuels are blended to produce a desired reactivity characteristic prior to injection.

The relative amounts of fuel passing through the flow-through and by-pass portions 92, 94 of the first conduit 80 are controlled by a modulatable three-way fluid flow control valve 96. Operation of the modulatable three-way fluid flow control valve 96 is regulated by a control signal 98 provided by the electronic control unit 44. The control signal 90 governing operation and modulation of the four-way fluid flow control valve 88, and the control signal 98 governing modulation and operation of the three-way fluid flow control valve 96, are generated by the programmable electronic control unit 44 in accordance with a sensed value of at least one engine operating parameter as provided by the sensor signals 40/42.

Although the present invention is described in terms of preferred illustrative embodiments, those skilled in the art will recognize that the above-described apparatus and method are illustrative of typical arrangements for using the present invention. For example, the fuel injectors, shown in the embodiments illustrated in FIGS. 2, 3, and 4, could either be placed directly into the combustion chamber or positioned at an intake port to the respective combustion chamber. Such arrangements of the apparatus and application of the method embodying the present invention are intended to fall within the scope of the following claims. Other aspects, features, and advantages of the present invention may be obtained from a study of this disclosure and the drawings, along with the appended claims.

What we claim is:

1. A method for controlling combustion timing in an homogenous-charge compression-ignition engine, comprising:

providing an intake manifold extending between a source of air and an intake port of said engine and having a flow-through portion and a by-pass portion, said by-pass portion having a catalyst incorporated therein adapted to oxidize a mixture of air and fuel passing through the by-pass portion of the intake manifold;

providing a source of fuel in fluid communication with said intake manifold at a position between said source of air and said flow-through and by-pass portions of the intake manifold;

introducing a continuous flow of air into said intake manifold;

injecting fuel into said continuous flow of air and forming a mixture of air and fuel in said intake manifold;

providing a means for controlling the relative amounts of the mixture of air and fuel passing through the flow-through and the by-pass portions of the intake manifold;

sensing at least one engine operating parameter; and controlling the relative amounts of the mixture of air and fuel passing through the flow-through portion and the by-pass portion of the intake manifold in response to a sensed value of said at least one engine operating parameter.

2. A method for controlling combustion timing in an homogenous-charge compression-ignition engine, comprising:

providing a fuel conduit extending between a source of a parent fuel and at least one fuel introduction port in fluid communication with a combustion chamber of said engine and having a flow-through portion and a by-pass portion, said by-pass portion having a means incorporated therein adapted to alter the reactivity of the parent fuel passing through the by-pass portion of the fuel conduit;

providing a means for controlling the relative amounts of fuel passing through the flow-through and the by-pass portions of the fuel conduit;

sensing at least one engine operating parameter; and controlling the relative amounts of fuel passing through the flow-through portion and the by-pass portion of the fuel conduit in response to a sensed value of said at least one engine operating parameter.

3. The method for controlling combustion timing in an homogenous-charge compression-ignition engine, as set forth in claim 2, wherein said providing a fuel conduit having flow-through and by-pass portions includes providing a fuel conduit having a catalyst disposed in said by-pass portion of the fuel conduit.

4. The method for controlling combustion timing in an homogenous-charge compression-ignition engine, as set forth in claim 2, wherein said providing a fuel conduit having flow-through and by-pass portions includes providing a fuel conduit having a non-thermal plasma generator disposed in said by-pass portion of the fuel conduit.

5. The method for controlling combustion timing in an homogenous-charge compression-ignition engine, as set forth in claim 2, wherein said means incorporated in the by-pass portion of the fuel conduit and adapted to alter the reactivity of the parent fuel passing through the by-pass portion of the fuel conduit includes a source of at least one fuel additive in controllable fluid communication with the by-pass portion of the fuel conduit, and said method includes controllably mixing a selected additive to a controlled portion of the parent fuel passing through said by-pass portion of the fuel conduit.

6. A method for controlling combustion timing in an homogenous-charge compression-ignition engine, comprising:

providing a fuel conduit extending between a source of fuel and at least one fuel introduction port in fluid communication with a combustion chamber of said engine;

providing at least one source of a fuel additive adapted to alter the reactivity of a fuel, said at least one source of fuel additive being in controllable fluid communication with said fuel conduit;

sensing at least one engine operating parameter; and controlling the amount of said fuel additive introduced into said fuel conduit in response to a sensed value of said at least one engine operating parameter.

7. The method for controlling combustion timing in an homogenous-charge compression-ignition engine, as set forth in claim 6, wherein said providing at least one source of a fuel additive adapted to alter the reactivity of a fuel includes providing a first source of a fuel additive adapted to increase the reactivity of a fuel and a second source of a fuel additive adapted to decrease the reactivity of a fuel and said controlling the amount of said fuel additive introduced into said fuel conduit includes selecting controlling the amount of fuel additive selected from one of said first source of fuel additive and said second source of a fuel additive in response to a sensed value of said at least one engine operating parameter.

8. An apparatus for controlling combustion timing in an homogenous-charge compression-ignition engine having an intake port through which a mixture of air and fuel is introduced into a combustion chamber of the engine, said apparatus comprising:

an intake manifold extending between a source of air and said intake port of the engine, said intake manifold having a flow-through portion and a by-pass portion;

a source of fuel disposed in controlled fluid communication with said intake manifold at a position between said source of air and said flow-through and by-pass portions of the intake manifold whereby fuel injected into said intake manifold at said position forms a mixture of air and fuel;

a catalyst disposed in said by-pass portion of the intake manifold and adapted to oxidize a mixture of air and fuel passing through the by-pass portion of the intake manifold;

a means for controlling the relative amounts of the mixture of air and fuel passing through the flow-through portion and the by-pass portion of the intake manifold;

a means for sensing at least one engine operating parameter and providing a signal correlative of the sensed engine operating parameter; and an electronic control unit in electrical communication with said a means for controlling the relative amounts of the mixture of air and fuel passing through the flow-through portion and the by-pass portion of said intake manifold and with said means for sensing at least one engine operating parameter and providing a signal correlative of the sensed engine operating parameter, said electronic control unit being adapted to provide a control signal to said means for controlling the relative amounts of the mixture of fuel and air passing through the flow-through and the by-pass portions of the intake manifold in response to said signal correlative of the sensed engine operating parameter.

9. The apparatus for controlling combustion timing in an homogenous-charge compression-ignition engine, as set forth in claim 8, wherein said catalyst is selected from a group consisting of zeolite, copper, platinum, palladium, rhodium and combinations thereof.

10. An apparatus for controlling combustion timing in an homogenous-charge compression-ignition engine having at least one fuel injector in direct fluid communication with a combustion chamber of the engine, said apparatus comprising:

a fuel conduit extending between a source of a parent fuel and at least one fuel injector, said fuel conduit having a flow-through portion and a by-pass portion, said by-pass portion having a means incorporated therein adapted to alter the reactivity of the parent fuel passing through the by-pass portion of the fuel conduit;

a means for controlling the relative amounts of fuel passing through the flow-through and the by-pass portions of the fuel conduit;

a means for sensing at least one engine operating parameter and providing a signal correlative of the sensed engine operating parameter; and an electronic control unit in electrical communication with said means for controlling the relative amounts of fuel passing through the flow-through portion and the by-pass portion of said fuel conduit and with said means for sensing at least one engine operating parameter, said electronic control unit being adapted to provide a control signal to said means for controlling the relative amounts of fuel passing through the flow-through and by-pass portions of the fuel conduit in response to said signal correlative of the sensed engine operating parameter.

11. The apparatus for controlling combustion timing in an homogenous-charge compression-ignition engine, as set forth in claim 10, wherein said means incorporated in the by-pass portion of the fuel conduit and adapted to alter the reactivity of the parent fuel passing through the by-pass portion of the fuel conduit comprises a reduction catalyst.

12. The apparatus for controlling combustion timing in an homogenous-charge compression-ignition engine, as set forth in claim 11, wherein said reduction catalyst is selected from a group consisting of zeolite, copper, platinum, palladium, rhodium and combinations thereof.

13. The apparatus for controlling combustion timing in an homogenous-charge compression-ignition engine, as set forth in claim 10, wherein said means incorporated in the by-pass portion of the fuel conduit and adapted to alter the reactivity of the parent fuel passing through the by-pass portion of the fuel conduit comprises a non-thermal plasma generator.

14. The apparatus for controlling combustion timing in an homogenous-charge compression-ignition engine, as set forth in claim 13, wherein said non-thermal plasma generator comprises a corona discharge device.

15. An apparatus for controlling combustion timing in an homogenous-charge compression-ignition engine having a first conduit extending between a source of fuel having a predetermined reactivity and at least one fuel introduction port, said apparatus comprising:
 a source of at least one fuel additive having a composition sufficient to alter the predetermined reactivity of said fuel when admixed therewith;
 a second conduit in controlled fluid communication with said source of a least one fuel additive and said fuel conduit;
 a means for controlling the amount of said fuel additive passing through said second conduit from said source of fuel additive to the first conduit;
 a means for sensing at least one engine operating parameter and providing a signal correlative of the sensed engine operating parameter; and
 an electronic control unit in electrical communication with said means for controlling the amount of said fuel additive passing through said second conduit from said source of fuel additive to the first conduit and with said means for sensing at least one engine operating parameter and providing a signal correlative of the sensed engine operating parameter, said electronic control unit being adapted to provide a control signal to said means for controlling the amount of fuel additive passing through said second fuel conduit in response to said signal correlative of the sensed engine operating parameter.

16. The apparatus for controlling combustion timing in an homogenous-charge compression-ignition engine, as set forth in claim 15, wherein said source of at least one fuel additive includes a source of an additive having a composition sufficient to increase the predetermined reactivity of said fuel.

17. The apparatus for controlling combustion timing in an homogenous-charge compression-ignition engine, as set forth in claim 16, wherein said additive having a composition sufficient to increase the predetermined reactivity of said fuel consists of at least one additive selected from the group consisting of ethyl-hexyl-nitrate and alkyl-nitrate treatment compositions applicable as Cetane improvers and ignition accelerators of diesel fuel.

18. The apparatus for controlling combustion timing in an homogenous-charge compression-ignition engine, as set forth in claim 15, wherein said source of at least one fuel additive includes a source of an additive having a composition sufficient to decrease the predetermined reactivity of said fuel.

19. The apparatus for controlling combustion timing in an homogenous-charge compression-ignition engine, as set forth in claim 18, wherein said additive having a composition sufficient to decrease the predetermined reactivity of said fuel comprises tetra-ethyl-lead.

20. The apparatus for controlling combustion timing in an homogenous-charge compression-ignition engine, as set forth in claim 15, wherein said source of at least one fuel additive having a composition sufficient to alter the predetermined reactivity of said fuel when admixed therewith includes a first source of fuel having a composition sufficient to increase the predetermined reactivity of said fuel and a second source of fuel having a composition sufficient to decrease the predetermined reactivity of said fuel.

21. An homogenous-charge compression-ignition engine, comprising:
 at least one combustion chamber;
 an intake port through which a mixture of air and fuel is introduced into said combustion chamber;
 an intake manifold extending between a source of air and said intake port, said intake manifold having a flow-through portion and a by-pass portion;
 a source of fuel disposed in controlled fluid communication with said intake manifold at a position between said source of air and said flow-through and said by-pass portions of the intake manifold whereby fuel injected into said intake manifold at said position forms a mixture of air and fuel;
 a catalyst disposed in said by-pass portion of the intake manifold and adapted to oxidize a mixture of air and fuel passing through the by-pass portion of the intake manifold;
 a means for controlling the relative amounts of the mixture of air and fuel passing through the flow-through portion and the by-pass portion of the intake manifold;
 a means for sensing at least one engine operating parameter and providing a signal correlative of the sensed engine operating parameter; and
 an electronic control unit in electrical communication with said a means for controlling the relative amounts of the mixture of air and fuel passing through the flow-through and the by-pass portions of said intake manifold and with said means for sensing at least one engine operating parameter and providing a signal correlative of the sensed engine operating parameter, said electronic control unit being adapted to provide a control signal to said means for controlling the relative amounts of the mixture of fuel and air passing through the flow-through and the by-pass portions of the intake manifold in response to said signal correlative of the sensed engine operating parameter.

22. The homogenous-charge compression-ignition engine, as set forth in claim 21, wherein said catalyst is selected from a group consisting of zeolite, copper, platinum, palladium, rhodium and combinations thereof.

23. An homogenous-charge compression-ignition engine, comprising:

at least one combustion chamber;

a fuel injector in direct fluid communication with said combustion chamber;

a source of fuel;

a fuel conduit extending between said source of fuel and said fuel injector, said fuel conduit having a flow-through portion and a by-pass portion, said by-pass portion having a means incorporated therein adapted to decompose fuel passing through the by-pass portion of the fuel conduit;

a means for controlling the relative amounts of fuel passing through the flow-through and the by-pass portions of the fuel conduit;

a means for sensing at least one engine operating parameter and providing a signal correlative of the sensed engine operating parameter; and an electronic control unit in electrical communication with said means for controlling the relative amounts of fuel passing through the flow-through portion and the by-pass portion of said fuel conduit and with said means for sensing at least one engine operating parameter, said electronic control unit being adapted to provide a control signal to said means for controlling the relative amounts of fuel passing through the flow-through and by-pass portions of the fuel conduit in response to said signal correlative of the sensed engine operating parameter.

24. The homogenous-charge compression-ignition engine, as set forth in claim 23, wherein said means incorporated in the by-pass portion of the fuel conduit and adapted to decompose fuel passing through the by-pass portion of the fuel conduit comprises a reduction catalyst.

25. The homogenous-charge compression-ignition engine, as set forth in claim 24, wherein said reduction catalyst is selected from a group consisting of zeolite, copper, platinum, palladium, rhodium and combinations thereof.

26. The homogenous-charge compression-ignition engine, as set forth in claim 23, wherein said means incorporated in the by-pass portion of the fuel conduit and adapted to decompose fuel passing through the by-pass portion of the fuel conduit comprises a non-thermal plasma generator.

27. The homogenous-charge compression-ignition engine, as set forth in claim 26, wherein said non-thermal plasma generator comprises a corona discharge device.

28. An homogenous-charge compression-ignition engine, comprising:

a fuel introduction port;

a source of fuel having a predetermined reactivity;

a first conduit extending between said fuel introduction port and said source of fuel;

a source of at least one fuel additive having a composition sufficient to alter the predetermined reactivity of said fuel when admixed therewith;

a second conduit in controlled fluid communication with said source of a least one fuel additive and said first conduit;

a means for controlling the amount of said fuel additive passing through said second conduit from said source of fuel additive to the first conduit;

a means for sensing at least one engine operating parameter and providing a signal correlative of the sensed engine operating parameter; and an electronic control unit in electrical communication with said means for controlling the amount of said fuel additive passing through said second conduit from said source of fuel additive to the first conduit and with said means for sensing at least one engine operating parameter and providing a signal correlative of the sensed engine operating parameter, said electronic control unit being adapted to provide a control signal to said means for controlling the amount of said fuel additive passing through said second fuel conduit in response to said signal correlative of the sensed engine operating parameter.

29. The homogenous-charge compression-ignition engine, as set forth in claim 28, wherein said source of at least one fuel additive includes a source of an additive having a composition sufficient to increase the predetermined reactivity of said fuel.

30. The homogenous-charge compression-ignition engine as set forth in claim 29, wherein said additive having a composition sufficient increase the predetermined reactivity of said fuel consists of at least one additive selected from the group consisting of ethyl-hexyl-nitrate and alkyl-nitrate treatment compositions applicable as Cetane improvers and ignition accelerators of diesel fuel.

31. The homogenous-charge compression-ignition engine, as set forth in claim 28, wherein said source of at least one fuel additive includes a source of an additive having a composition sufficient to decrease the predetermined reactivity of said fuel.

32. The homogenous-charge compression-ignition engine, as set forth in claim 31, wherein said additive having a composition sufficient to decrease the predetermined reactivity of said fuel comprises tetra-ethyl-lead.

33. The homogenous-charge compression-ignition engine, as set forth in claim 28, wherein said source of at least one fuel additive having a composition sufficient to alter the predetermined reactivity of said fuel when admixed therewith includes a first source of fuel having a composition sufficient to increase the predetermined reactivity of said fuel and a second source of fuel having a composition sufficient to decrease the predetermined reactivity of said fuel.

\* \* \* \* \*